United States Patent
Ma et al.

(10) Patent No.: US 11,277,231 B2
(45) Date of Patent: Mar. 15, 2022

(54) REDUNDANCY VERSION DESIGN SOLUTION IN COMMUNICATION SYSTEMS

(71) Applicant: HUAWEI TECHNOLOGIES CO., LTD., Guangdong (CN)

(72) Inventors: Liang Ma, Shanghai (CN); Carmela Cozzo, San Diego, CA (US); Xin Zeng, Shenzhen (CN); Yuejun Wei, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 142 days.

(21) Appl. No.: 16/833,655

(22) Filed: Mar. 29, 2020

(65) Prior Publication Data
US 2020/0228254 A1  Jul. 16, 2020

Related U.S. Application Data (63) Continuation of application No. PCT/CN2018/108360, filed on Sep. 28, 2018.

(30) Foreign Application Priority Data

Sep. 29, 2017 (CN) .......................... 201710911469.4

(51) Int. Cl.
H04L 1/18 (2006.01)

(52) U.S. Cl.
CPC ............ *H04L 1/1819* (2013.01); *H04L 1/189* (2013.01); *H04L 1/1825* (2013.01); *H04L 1/1896* (2013.01)

(58) Field of Classification Search
None
See application file for complete search history.

(56) References Cited

U.S. PATENT DOCUMENTS

| 2016/0219641 A1 | 7/2016 | Chae et al. |
| 2017/0207884 A1 | 7/2017 | Jiang et al. |

FOREIGN PATENT DOCUMENTS

| CN | 1864422 A | 11/2006 |
| CN | 101188428 A | 5/2008 |

(Continued)

OTHER PUBLICATIONS

"Chairman's notes of AI 6.1.4 Channel Coding," 3GPP TSG RAN WG1 NR Adhoc #3, Nagoya, Japan, R1-1716868, Total 6 pages, 3rd Generation Partnership Project, Valbonne, France (Sep. 18-21, 2017).

(Continued)

*Primary Examiner* — Saad Khawar
(74) *Attorney, Agent, or Firm* — Leydig, Voit & Mayer, Ltd.

(57) ABSTRACT

This application discloses an information processing method, an apparatus, a communication device, and a communication system. The communication device is configured to determine a redundancy version transmission sequence, where the redundancy version transmission sequence is used to indicate a sending sequence of a plurality of redundancy versions; determine a transmission number; and obtain a redundancy version from a buffer sequence based on the redundancy version transmission sequence and the transmission number and send the redundancy version. The communication device may be applied to a communication system supporting a plurality of redundancy version transmission sequences, for example, a 5th generation (5G) communication system. Because the redundancy version transmission sequence is determined before data transmission, communication efficiency is improved, and HARQ performance is improved.

27 Claims, 5 Drawing Sheets

(56) References Cited

FOREIGN PATENT DOCUMENTS

| | | |
|---|---|---|
| CN | 101741527 A | 6/2010 |
| CN | 101754274 A | 6/2010 |
| CN | 101809885 A | 8/2010 |
| CN | 101843025 A | 9/2010 |
| CN | 103248464 A | 8/2013 |
| CN | 103428836 A | 12/2013 |
| CN | 103795505 A | 5/2014 |
| CN | 106817195 A | 6/2017 |
| CN | 107113123 A | 8/2017 |
| CN | 107197528 A | 9/2017 |

OTHER PUBLICATIONS

ZTE et al,"Bit rearrangement of LDPC for high order modulation",3GPP TSG RAN WG1 AH_NR Meeting,R1-1700248, Spokane, USA Jan. 16-20, 2017, total 5 pages.

Gallager R G."Low-density parity-check codes" Information Theory, IRE Transactions on, 1962, 8(1): 21-28, total 8 pages.

3GPP TS 38.214 V1.0.0 (Sep. 2017),3rd Generation Partnership Project;Technical Specification Group Radio Access Network;NR;Physical layer procedures for data (Release 15), total 32 pages.

3GPP TS 38.300 V1.0 0 (Sep. 2017),3rd Generation Partnership Project;Technical Specification Group Radio Access Network;NR; NR and NG-RAN Overall Description;Stage 2(Release 15), total 59 pages.

3GPP TS 38.331 V0.1.0 (Oct. 2017),3rd Generation Partnership Project;Technical Specification Group Radio Access Network;NR-;Radio Resource Control (RRC);Protocol specification(Release 15), total 42 pages.

"3rd Generation Partnership Project; Technical Specification Group Radio Access Network; NR; Multiplexing and channel coding (Release 15)," 3GPP TS 38.212 V1.0.0, total 28 pages, 3rd Generation Partnership Project, Valbonne, France (Sep. 2017).

Sony, Discussion on the pre-emption and HARQ of UL transmission without grant. 3GPP TSG RAN WG1 Meeting NR#3, Nagoya, Japan, Sep. 18 21, 2017, R1-1716250, 5 pages.

Samsung, Rate matching for data channel coding. 3GPP TSG RAN WG1 Meeting NR#3, Nagoya, Japan, Sep. 18 21, 2017, R1-1716668, 4 pages.

Huawei, HiSilicon, Rate matching for LDPC codes. 3GPP TSG RAN WG1 Meeting NR#3, Nagoya, Japan, Sep. 18 21, 2017, R1-1715502, 7 pages.

REDUNDANCY VERSION DESIGN SOLUTION IN COMMUNICATION SYSTEMS

CROSS REFERENCE TO RELATED APPLICATIONS

This application is a continuation of International Patent Application No. PCT/CN2018/108360, filed on Sep. 28, 2018, which claims priority to Chinese Patent Application No. 201710911469.4, filed on Sep. 29, 2017. The disclosures of the aforementioned patent applications are hereby incorporated by reference in their entireties.

TECHNICAL FIELD

Embodiments of the present application relate to communications field, and more specifically, rather than limitation, the embodiments of the present application relate to a redundancy version (RV) design for retransmission in a communication system.

BACKGROUND

In a wireless communication system, hybrid automatic repeat request (HARQ) technology is an important technology, and can well improve data link reliability.

Low-density parity-check (LDPC) codes are a type of linear block codes that have a sparse parity-check matrix and are featured by a flexible structure and low decoding complexity. Because of use of partially parallel iteration decoding algorithms, the LDPC codes have higher throughput rates than conventional Turbo codes. The LDPC codes are considered as next-generation error correcting codes for communication systems and can be used to improve reliability and power utilization of channel transmission. The LDPC codes can be widely applied to space communications, fiber optic communications, personal communication systems, ADSLs (Asymmetric Digital Subscriber Lines), magnetic recording devices, and the like. Currently, in fifth generation (5G) mobile communication systems, it is already considered to use the LDPC codes as one of channel coding schemes.

To support different code lengths and code rates, a communication device performs rate matching after channel coding to adjust a code rate of a coded block, and obtains a bit sequence that needs to be sent to match a decoding code rate. During the rate matching, the communication device may further perform bit puncturing on an LDPC code block generated after encoding, to increase the code rate; or during the rate matching, perform bit repetition on an LDPC code block generated after encoding, to decrease the code rate.

During the rate matching, a communication device at a transmit end selects a bit sequence that needs to be sent, and sends the bit sequence to a communication device at a receive end after such processing as interleaving and mapping etc. The communication device at the receive end combines soft values of the bit sequence with stored soft value bits (soft channel bit) for decoding, to obtain a code block.

When the communication device uses an existing rate matching method for a bit sequence encoded by using the LDPC code, HARQ performance is relatively poor.

SUMMARY

Embodiments of the present application provide an information processing method, an apparatus, a communication device, and a communication system, to improve HARQ performance.

According to a first aspect, an information processing method in a communication system is provided. The method includes:

determining a redundancy version sequence, where the redundancy version sequence is used to indicate a transmitting order of a plurality of redundancy versions;

determining a transmission number; and obtaining a redundancy version from a buffer sequence based on the redundancy version sequence and the transmission number, and sending the redundancy version.

In a possible implementation, the method further includes:

sending information indicating the redundancy version sequence.

According to a second aspect, an information processing method in a communication system is provided. The method includes:

determining a redundancy version sequence, where the redundancy version sequence is used to indicate an order of sending a plurality of redundancy versions;

determining a transmission number; and combining received redundancy versions in a buffer sequence based on the redundancy version sequence and the transmission number.

Optionally, the method further includes: performing LDPC decoding on the buffer sequence.

In a possible implementation of the second aspect, information indicating the redundancy version sequence may be received, and the redundancy version sequence may be determined based on the information indicating the redundancy version sequence.

Based on the foregoing aspects or the foregoing possible implementations, in another possible implementation, the redundancy version sequence may be determined based on at least one of the following factors: a service type, a transmission mode, or a transmission code rate;

the service type includes at least one of the following: eMBB, URLLC, mMTC, VoNR, or the like; and the transmission mode includes at least one of the following: grant free, multislot aggregation, or the like.

The foregoing factors may be each used as a transmission scenario, or may be combined to obtain a transmission scenario, and a redundancy version sequence that can match performance of a corresponding transmission scenario is obtained based on the scenario, thereby improving HARQ performance.

In a design, if the service type is eMBB, the redundancy version sequence is indicated by a sequence of redundancy version numbers as {0, 2, 3, 1} or {0, 3, 2, 1}.

In another design, if the service type is URLLC, the redundancy version sequence is indicated by a sequence of redundancy version numbers as {0, 3, 2, 1} or {0, 3, 0, 3}.

In another design, if the transmission mode is grant free or multislot aggregation, the redundancy version sequence is indicated by a sequence of redundancy version numbers as {0, 3, 0, 3}.

It may be understood that, the foregoing designs may be separately applied, or may be applied in a combined manner.

In a possible design of the foregoing aspects or the foregoing implementations, the plurality of redundancy versions each are a self-decodable redundancy version. For example, the redundancy version sequence may be one of the following: {0, 3, 0, 3}, {0, 3, 3, 3}, {0, 0, 3, 3}, {0, 3, 3, 0}, {0, 0, 0, 3}, {0, 0, 0, 0}, or {3, 3, 3, 3}.

Because there are at least two self-decodable redundancy versions in bit sequences during a plurality of retransmissions, a decoding success rate is improved, and a quantity of retransmissions is reduced.

Based on the foregoing aspects or the foregoing possible implementations, in another possible design, the redundancy version sequence may be one of the following: {0, 3, 0, 3}, {0, 3, 3, 3}, {0, 0, 3, 3}, {0, 3, 3, 0}, {0, 0, 0, 3}, {0, 0, 0, 0}, {3, 3, 3, 3}, {0, 2, 3, 1}, or {0, 3, 2, 1}.

In a possible design of the foregoing aspects, the information indicating the redundancy version sequence is sent on a downlink control channel or a downlink data channel. For example, the information indicating the redundancy version sequence is carried by a physical layer signaling or RRC signaling and sent on the downlink control channel or the downlink data channel.

If a base graph of an LDPC code is BG1, four corresponding starting positions are respectively {0z, 17z, 33z, 56z}. Correspondingly, a redundancy version 0 is a bit sequence obtained from bit 0z in a buffer sequence W;

a redundancy version 1 is a bit sequence obtained from bit 17z in the buffer sequence W;

a redundancy version 2 is a bit sequence obtained from bit 33z in the buffer sequence W; and a redundancy version 3 is a bit sequence obtained from bit 56z in the buffer sequence W.

If a base graph of an LDPC code is BG2, four corresponding starting positions are respectively {0z, 13z, 25z, 43z}. Correspondingly, a redundancy version 0 is a bit sequence obtained from bit 0z in a buffer sequence W;

a redundancy version 1 is a bit sequence obtained from bit 13z in the buffer sequence W;

a redundancy version 2 is a bit sequence obtained from bit 25z in the buffer sequence W; and a redundancy version 3 is a bit sequence obtained from bit 43z in the buffer sequence W.

In a possible design, the redundancy version number keeps consistent with a number $rv_{idx}$ of the starting position.

Optionally, the redundancy version sequence may be indicated by a sequence of numbers of starting positions; or may be indicated by a sequence of starting positions; or may be indicated by the redundancy version number sequence. In this manner, each redundancy version sequence is identified by one number. The information used to indicate the redundancy version order may include the sequence of the numbers of the starting positions, or the sequence of the starting positions, or the redundancy version number sequence.

According to a third aspect, a communication apparatus is provided. The communication apparatus may include corresponding modules configured to perform any one of the possible implementations of the first aspect in the foregoing method designs. The modules may be software and/or hardware.

In a possible design, the communication apparatus according to the third aspect includes a processing unit, configured to determine a redundancy version sequence and a transmission number; an obtaining unit, configured to obtain a redundancy version from a buffer sequence based on the redundancy version sequence and the transmission number; and a transceiver unit, configured to send the redundancy version.

The apparatus may be configured to perform the method according to any one of the possible implementations of the first aspect. For details, refer to the descriptions of the foregoing aspect.

In a possible design, the processing unit and the obtaining unit may be one or more processors, and may control the transceiver unit to send information indicating the redundancy version sequence.

The transceiver unit is configured to input/output a signal, for example, configured to output a signal corresponding to an output bit sequence, and optionally, may further send the information indicating the redundancy version sequence.

The transceiver unit may be a transceiver, or may be an input/output circuit or a communication interface. For example, the communication apparatus may be a terminal or a base station or a network device, and the transceiver unit of the communication apparatus may be a transceiver. The communication apparatus may alternatively be a chip, and a transceiver component of the communication apparatus may be an input/output circuit of the chip.

According to a fourth aspect, a communication apparatus is provided. The communication apparatus may include corresponding modules configured to perform any one of the possible implementations of the second aspect in the foregoing method designs. The modules may be software and/or hardware.

In a possible design, the communication apparatus according to the fourth aspect includes:

a determining unit, configured to determine a redundancy version sequence and a transmission number; and a processing unit, configured to combine received redundancy versions in a buffer sequence based on the redundancy version sequence and the transmission number.

Optionally, the processing unit may be further configured to perform LDPC decoding on the buffer sequence.

The apparatus may be configured to perform the method according to any one of the possible implementations of the second aspect. For details, refer to the descriptions of the foregoing aspect.

In a possible design, the processing unit and the determining unit may be one or more processors.

Optionally, the apparatus may further include a transceiver unit, configured to: receive information indicating the redundancy version sequence and receive a signal including a redundancy version of a buffer sequence W.

The transceiver unit is configured to input/output a signal, for example, configured to receive a signal including a soft bit sequence.

The transceiver unit may be a transceiver, or may be an input/output circuit or a communication interface. For example, the communication apparatus may be a terminal or a base station or a network device, and the transceiver unit of the communication apparatus may be a transceiver. The communication apparatus may alternatively be a chip, and a transceiver component of the communication apparatus may be an input/output circuit of the chip.

According to a fifth aspect, a communication apparatus is provided. The communication apparatus includes one or more processors.

In a possible design, the one or more processors may be configured to implement a function according to any one of the first aspect or the implementations of the first aspect. Optionally, the processor may be further configured to implement another function in addition to the function according to any one of the first aspect or the implementations of the first aspect.

In a possible design, the one or more processors may be configured to implement a function according to any one of the second aspect or the implementations of the second aspect. Optionally, the processor may be further configured to implement another function in addition to the function according to any one of the second aspect or the implementations of the second aspect.

Optionally, the communication apparatus according to the fifth aspect may further include a transceiver and an antenna.

Optionally, the communication apparatus according to the third aspect to the fifth aspect may further include a component configured to generate a transport block CRC, a component used for code block segmentation and CRC check, an encoder, an interleaver used for interleaving, a modulator used for modulation processing, or the like. In a possible design, functions of these components may be implemented by the one or more processors.

Optionally, the communication apparatus according to the third aspect to the fifth aspect may further include a demodulator configured to perform a demodulation operation, a de-interleaver used for de-interleaving, a decoder, or the like. In a possible design, functions of these components may be implemented by the one or more processors.

According to a sixth aspect, an embodiment of the present application provides a communication system. The system includes the communication apparatus according to any one of the third aspect to the fifth aspect.

According to another aspect, an embodiment of the present application provides a computer storage medium. The computer storage medium stores a program, and when the program is run, a computer is enabled to perform the methods according to the foregoing aspects.

According to still another aspect of this application, a computer program product including an instruction is provided. When the instruction is run on a computer, the computer is enabled to perform the methods according to the foregoing aspects.

According to the information processing method, the apparatus, the communication device, and the communication system in the embodiments of the present application, HARQ performance can be improved.

BRIEF DESCRIPTION OF DRAWINGS

FIG. 1-1 is a base graph of an LDPC code;
FIG. 1-2 is another base graph of an LDPC code.

DESCRIPTION OF EMBODIMENTS

For ease of understanding, some nouns involved in this application are described below.

In this application, nouns "network" and "system" are often interchangeably used, and "apparatus" and "device" are also often interchangeably used, meanings of which are conventionally understood. A "communication apparatus" may be a microchip (such as a baseband chip, a digital signal processing chip, or a general-purpose chip), a terminal, a base station, or another network device.

A terminal is a device having a communication function, and may include a handheld device, an in-vehicle device, a wearable device, a computing device, another processing device connected to a wireless modem, or the like that has a wireless communication function. The terminal may be deployed on land, including an indoor or outdoor device, a handheld device, or an in-vehicle device; or may be deployed on water (for example, on a vessel); or may be deployed in air (for example, on an air plane, a balloon, or a satellite). The terminal may be a mobile phone, a tablet computer (such as a Pad), a computer having a wireless sending/receiving function, a virtual reality (VR) terminal device, an augmented reality (AR) terminal device, a wireless terminal in industrial control, a wireless terminal in self driving scheme, a wireless terminal in remote medical scheme, a wireless terminal in a smart grid scheme, a wireless terminal in transportation safety scheme, a wireless terminal in a smart city scheme, a wireless terminal in a smart home scheme, and the like. The terminal may have different names in different networks, for example, user equipment, a mobile console, a subscriber unit, a station, a cellular phone, a personal digital assistant, a wireless modem, a wireless communication device, a handheld device, a laptop computer, a cordless phone, and a wireless local loop station. For ease of description, these devices are simply referred to as the terminal in this application.

A base station (BS) may also be referred to as a base station device, and is a device deployed in a radio access network to provide a wireless communication function. The base station may have different names in different radio access systems. For example, in a universal mobile telecommunication system (UMTS) network, the base station is referred to as a NodeB (NodeB); in an LTE network, the base station is referred to as an evolved NodeB (eNB or eNodeB); in a new radio (NR) network, the base station is referred to as a transmission reception point (TRP) or a next-generation NodeB (gNB); or in a network integrating a plurality of other technologies or in other evolved networks, the base station may have other names. The present application is not limited thereto.

The following describes the technical solutions in the embodiments of the present application with reference to the accompanying drawings in the embodiments of the present application.

Figure 12:
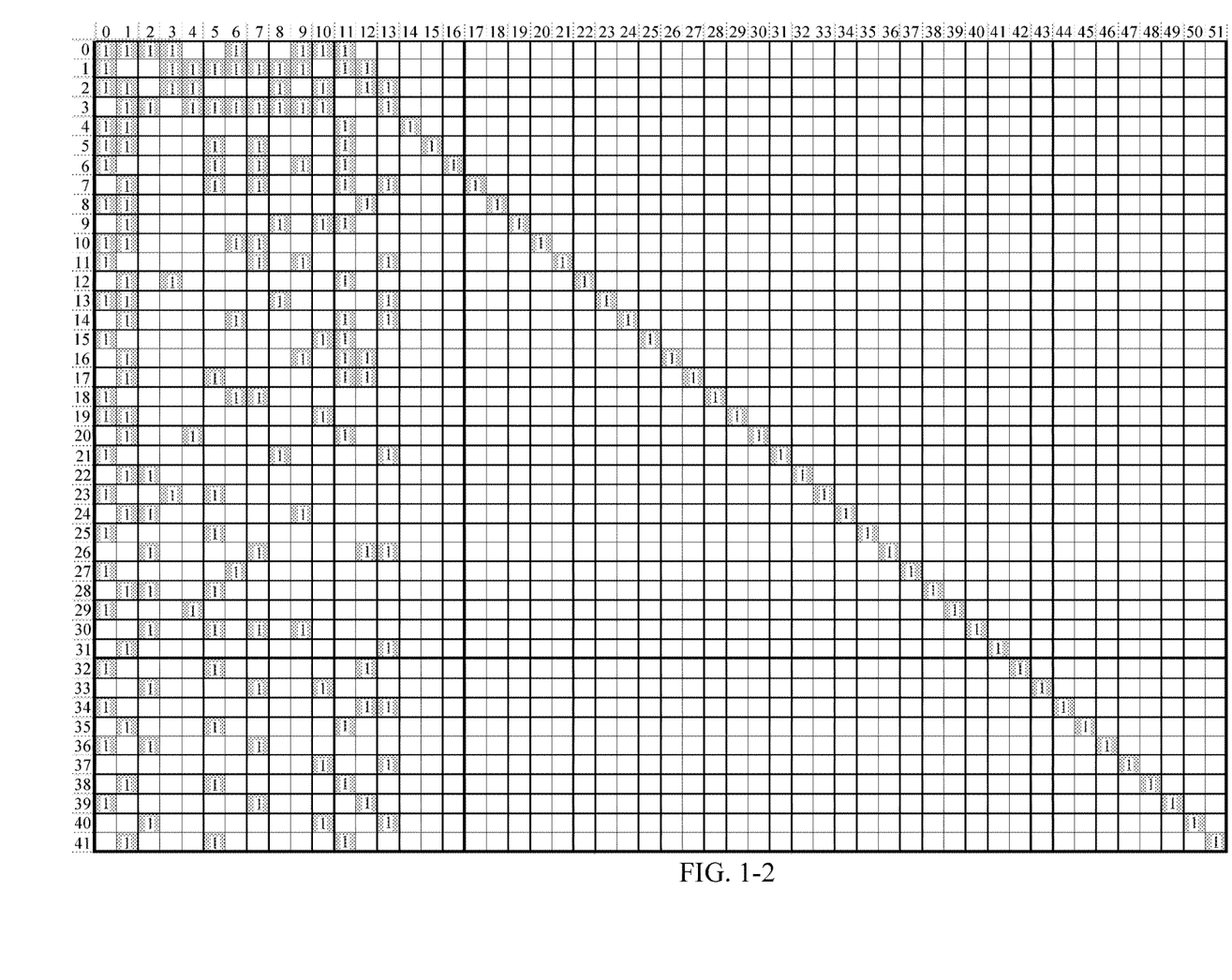

An LDPC code may be used by a communication system to perform encoding. For example, in a 5G system, the LDPC code is for data encoding. The LDPC code may be usually presented by using a parity check matrix H. The parity check matrix H of the LDPC code may be obtained by using a base graph and a shift value. The base graph may usually include m*n matrix elements (entries), and may be indicated in a form of a matrix with m rows and n columns. A value of a matrix element is either 0 or 1. An element having a value of 0 is sometimes also referred to as a zero element, and it indicates that the element can be replaced by a z*z all-zero matrix. An element having a value of 1 is sometimes also referred to as a non-zero element, and it indicates that the element can be replaced by a z*z circular permutation matrix. In other words, each matrix element indicates either an all-zero matrix or a circular permutation matrix. FIG. 1-1 and FIG. 1-2 provide examples of two base graphs of the LDPC code. A size of BG1 shown in FIG. 1-1 is 46 rows and 68 columns. A size of BG2 shown in FIG. 1-2 is 42 rows and 52 columns. In the base graph shown in the foregoing figure, a row index is marked on the leftmost column, and a column index is marked on the uppermost column. Only non-zero elements are shown in each column and row, and are indicated by "1", and a blank part is a zero element. The column 0 and the column 1 are columns of built-in puncture bits which are not written into a circular buffer.

If an element in row i and column j in the base graph has a value of 1 and a shift value of $P_{i,j}$, where $P_{i,j}$ is an integer greater than or equal to 0, it indicates that the element having the value of 1 in the row i and the column j may be replaced by a z*z circular permutation matrix corresponding to $P_{i,j}$ and the circular permutation matrix may be obtained by circularly shifting an identity matrix of size z*z to the right $P_{i,j}$ times. It can be learned that each element having a value of 0 in the base graph is replaced by a z*z all-zero matrix, and each element having a value of 1 is replaced by a z*z circular permutation matrix corresponding to a shift value of the element, so that the parity check matrix of the LDPC code can be obtained. z is a positive integer and may also be referred to as a lifting size, and may be determined based on a code block size that are supported by a system and an information data size. It can be learned that a size of the parity check matrix H is (m*z)*(n*z).

Value of $P_{i,j}$ may depend on the lifting size z, for an element having a value of 1 at a same position in the matrix, $P_{i,j}$ may be different for different lifting sizes Z. For ease of implementation, usually, an m*n base matrix (parity check matrix) is further defined in the system. And a position of each element in the base matrix is in a one-to-one correspondence with a position of each element in the base graph. A zero element in the base graph has a same position in the base matrix and is indicated by −1 or null, and a non-zero element having a value of 1 at the row i and the column j in the base graph have a same position in the base matrix and may be indicated by $P_{i,j}$. $P_{i,j}$ is a positive integer greater than or equal to 0. In this embodiment of this application, the base matrix is sometimes referred to as a shift matrix of a base graph.

In the communication system, information data is transmitted between communication devices (for example, a base station or a terminal). Because a wireless transmission environment is complex, variable, and easily interfered, an error easily occurs. To reliably send information data, a communication device at a transmit end performs processing such as CRC check, channel coding, rate matching, and interleaving on the information data, maps interleaved coded bits into modulated symbols, and sends the modulated symbols to a communication device at a receive end. After receiving the modulated symbols, the receiving device restores the modulated symbols into the information data by correspondingly performing de-interleaving, rate de-matching, decoding, and CRC check. In these processes, transmission errors can be reduced and reliability of data transmission can be improved.

Figure 2:
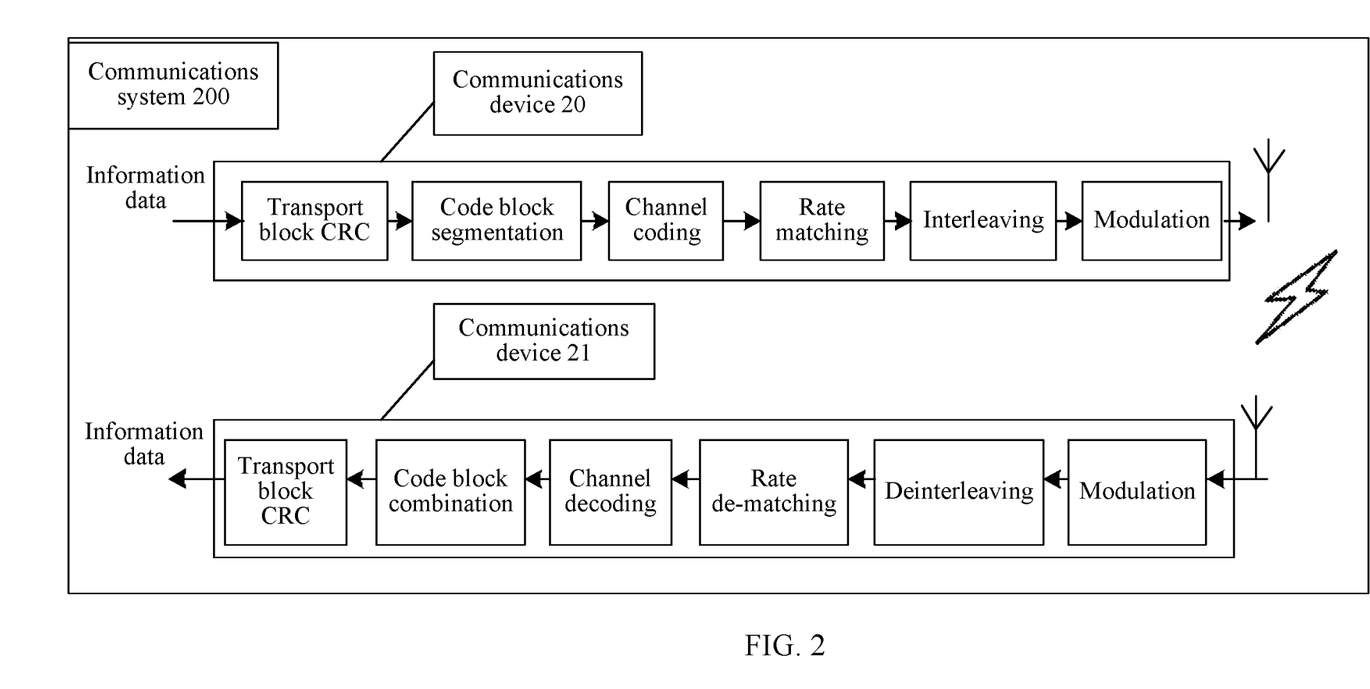
FIG. 2 is a structural diagram of a communication system according to an embodiment of the present application.

A communication system 200 shown in FIG. 2 may be widely applied to different types of communication such as speech communication and data communication. The communication system may include a plurality of wireless communication devices. For clarity, FIG. 2 shows only a communication device 20 and a communication device 21. Control information or data information is received and sent between the communication device 20 and the communication device 21 as an information sequence. In a possible design, the communication device 20 as a communication device at a transmit end performs LDPC encoding processing on a bit sequence C of a length of K. The bit sequence C may be a bit sequence of control or data information to be sent by the communication device 20, or is obtained by performing at least code block segmentation processing on the bit sequence. The bit sequence C having a length of K may further include cyclic check bits and may further include filling bits.

In a possible implementation, the communication device 20 determines, based on the length K of the bit sequence C, an LDPC matrix used for encoding. For example, the communication device 20 may determine a lifting size z based on K, and then perform lifting on a base matrix of a corresponding code rate based on z to obtain an LDPC matrix. An encoded bit sequence (i.e. a coded block) may be obtained by encoding the bit sequence C by using the LDPC matrix. If shortening is not performed, a bit sequence D may be the encoded bit sequence; or if a shortening operation is performed on the encoded bit sequence, that is, $s_0$ bits are shortened from the bit sequence, for example, $s_0$ bits are deleted from the encoded bit sequence, the bit sequence D may be a bit sequence obtained by shortening $s_0$ bits from the encoded bit sequence. $s_0$ is an integer greater than or equal to 0. For example, $s_0 = n \cdot r$, n is a positive integer, and r is a quantity of bits included in a unit bit segment in a buffer sequence W. The unit bit segment reflects a granularity of starting positions that are set in the buffer sequence W. For example, the starting positions may be set in the buffer sequence W based on an integer multiple of the lifting size, that is, a quantity r of bits included in the unit bit segment is equal to z. For another example, before the bit sequence D enters the buffer sequence W, interleaving needs to be performed on the bit sequence D. If a quantity of columns of an interleaving matrix is $C_{subblock}$, a quantity of rows of the interleaving matrix is $R_{subblock}$. $R_{subblock}$ is a minimum integer satisfying $K_D \leq C_{subblock} \cdot R_{subblock}$, and the quantity r of bits included in the unit bit segment may be $R_{subblock}$. That is, the starting positions may be set based on an integer multiple of $R_{subblock}$. A length of the bit sequence D is $K_D$. The bit sequence D may include a plurality of bits in the bit sequence C, and may further include one or more parity bits, and a bit in the bit sequence C is sometimes also referred to as an information bit or a systematic bit in the bit sequence D. In the present application, the bit sequence D is sometimes also referred to as a coded block. Each coded block includes information bits and parity bits. The information bits may include filling bit(s). If the information bits includes a filling bit, the filling bit is usually indicated by "null".

A coded block or a coded block on which bit reordering is performed is stored in a circular buffer of the communication device 20, and the communication device 20 obtains a plurality of output bits sequentially from the coded block stored in the circular buffer, to obtain an output bit sequence. An output bit is a bit other than a filling bit in the coded block, so that the output bit sequence does not include any filling bit. The output bit sequence is sent after being interleaved and mapped into modulated symbols. When retransmission occurs, the communication device 20 selects another output bit sequence from the coded block stored in the circular buffer for sending. If the output bit obtained sequentially reaches the last bit of the circular buffer, an output bit is continuously selected from bit 1 of the circular buffer. An output bit sequence selected from a coded block in the circular buffer may also be referred to as a redundancy version (rv) of the coded block.

After demodulating and de-interleaving the received modulated symbol, the communication device 21 stores soft values of the received output bit sequence in a corresponding position in a soft information buffer (soft buffer). If retransmission occurs, the communication device 21 combines soft values of output bit sequences during all retransmissions and stores the combined soft values in the soft information buffer. Combination herein means that if two output bits received at two different times are at the same positions, soft values of the two output bits received at two different times are combined. In a design, positions in the soft information buffer in the communication device 21 are in a one-to-one correspondence with positions of coded blocks in the circular buffer in the communication device 20. That is, if the position of the output bit in the coded block in the circular buffer of the communication device 20 is bit p, the position of the soft value of the output bit in the soft information buffer of the communication device 21 is also bit p.

The communication device 21 decodes all soft values in the soft information buffer to obtain a code block of an information sequence. Because the communication device 21 may obtain a transport block size, the communication device 21 may determine a quantity of code blocks into which one transport block is segmented and a length of each code block. If a code block includes a CRC bit segment, the communication device 21 may further check the code block by using the CRC bit segment. The communication device 21 concatenates all code blocks into one transport block, and further checks and concatenates the transport block with others to finally obtain the information sequence. It can be learned that the communication device 21 performs an inverse process of an information processing method of the communication device 20.

It should be noted that, herein, a process of receiving and sending the information sequence between the communication device 20 and the communication device 21 is merely an example. Division of these modules is merely an example, and some modules may be optional according to a system design requirement, or functions of some modules may be combined and performed in one module. This is not limited. In addition, these modules may be implemented by using software, or hardware, or a combination of software and hardware, for example, may be implemented by one or more processors. The present application is not limited thereto.

It should be noted that, in various embodiments of the present application, the communication device 20 may be a network device such as a base station in the communication system, and the corresponding communication device 21 may be a terminal. The communication device 20 may alternatively be a terminal in the communication system, and correspondingly, the communication device 21 may be a network device such as a base station in the communication system. The communication device 20 and the communication device 21 may alternatively be chips, for example, the modules in the foregoing processing process may be implemented by the one or more processors.

Figure 3:
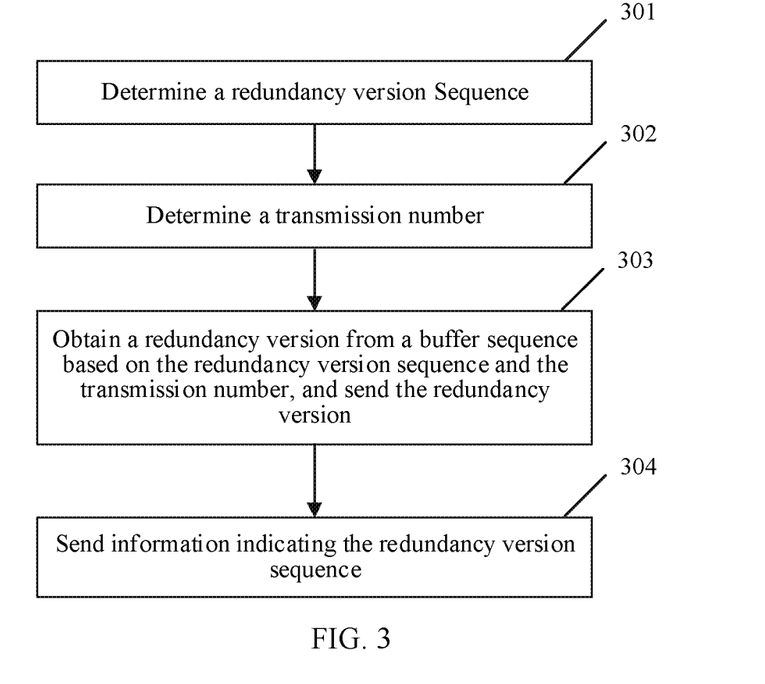
FIG. 3 is a flowchart of an information processing method according to some embodiments of the present application.

FIG. 3 is a schematic flowchart of an information processing method according to an embodiment of the present application. The method may be applied to a communication system. The communication system includes a communication device 20 and a communication device 21. The method may be implemented by the communication device 20 and includes the following steps.

301: Determine a redundancy version sequence.

The redundancy version sequence is used to indicate a sequence of sending a plurality of redundancy versions.

The foregoing bit sequence D of the coded block is used as an example. The communication device 20 may determine an output bit sequence based on the bit sequence D or a part of the bit sequence D. When supporting retransmission, the communication device may determine, based on the bit sequence D or the part of the bit sequence D, an output bit sequence during each transmission.

In a possible design, a buffer sequence W having a length of $N_{CB}$ may include the bit sequence D or the part of the bit sequence D, and the buffer sequence including each bit is an LDPC code.

In a possible implementation, the buffer sequence W may include all bits in the bit sequence D. For example, the buffer sequence W may include the bit sequence D. For another example, the buffer sequence W may include the bit sequence D on which at least interleaving processing has been performed. For another example, the buffer sequence may include the bit sequence D on which at least filling processing has been performed. For another example, the buffer sequence may include the bit sequence D on which at least interleaving processing and filling processing have been performed.

In another possible implementation, the buffer sequence W may include some bits in the bit sequence D. For example, the length of the bit sequence D exceeds a maximum length of the buffer sequence W, and therefore, the buffer sequence W can include only some bits in the bit sequence D. Similarly, the buffer sequence W may include some bits in the bit sequence D. For another example, the buffer sequence W may include some bits in the bit sequence D on which at least interleaving processing has been performed. For another example, the buffer sequence may include some bits in the bit sequence D on which at least filling processing has been performed. For another example, the buffer sequence may include some bits in the bit sequence D on which at least interleaving processing and filling processing have been performed.

The buffer sequence W may also be referred to as a circular buffer. When initial transmission or retransmission is performed, the communication device 20 determines an output bit sequence for the initial transmission or the retransmission in the bit sequence stored in the circular buffer. For ease of description, transmission i indicates the initial transmission or the retransmission. When i=0, it indicates the initial transmission, or when i>0, it indicates the retransmission, where i is an integer. For example, when i=1, it indicates the first retransmission, or when i=2, it indicates the second retransmission. An upper limit of retransmissions depends on a maximum quantity of retransmissions in a system. An output bit sequence for each initial transmission or retransmission may be a redundancy version of the bit sequence D.

In a possible design, $k_{max}$ starting positions may be fixedly set in the buffer sequence W, where $k_{max}$ is an integer greater than or equal to 4. Each starting position may be indicated by a number, namely, an index (index), for example, indicated by $rv_{idx}$, and $0 \leq rv_{idx} < k_{max}$. For example, $k_{max}=4$, and values of numbers $rv_{idx}$ of four starting positions are respectively one of 0, 1, 2, or 3.

An output bit sequence during each transmission may be obtained from one of $k_{max}$ starting positions in the buffer sequence W. If there are $k_{max}$ starting positions, $k_{max}$ redundancy versions may be obtained. Each redundancy version may correspond to the number $rv_{idx}$ of the starting position in the buffer sequence W.

An example in which $k_{max}=4$ is used for description below. In other words, four redundancy versions may be obtained from the buffer sequence W. It may be understood that, the present application is not limited thereto, and $k_{max}$ may also be another value.

An example in which a base graph of an LDPC code is BG1 shown in FIG. 1-1 is used. A bit position starts to be numbered from 0, and the starting position may be an integer multiple of a lifting size. A redundancy version 0 is a bit sequence obtained from a position with $rv_{idx}=0$, namely, bit 0z in the buffer sequence W. A redundancy version 1 is a bit sequence obtained from a position with $rv_{idx}=1$, namely, bit 17z in the buffer sequence W. A redundancy version 2 is a bit sequence obtained from a position with $rv_{idx}=2$, namely, bit 33z in the buffer sequence W. Redundancy version 3 is a bit sequence obtained from a position with $rv_{idx}=3$, namely, bit 56z in the buffer sequence W. Redundancy version number may alternatively be indicated by $rv_{idx}$ sometimes. It may be understood that, a position of the bit 0z is a bit with a position number of 0; the bit 17z is a bit with a position number of 17z; the bit 33z is a bit with a position number of 33z; and the rest can be deduced by analogy. Details are not described again below.

Systematic bits and parity bits included in output bit sequences obtained from different starting positions have different compositions. Redundancy version 0 includes a relatively large quantity of systematic bits, and if there is no interference or loss in a receiving process, redundancy version 0 can be usually decoded independently, that is, redundancy version 0 is a self-decodable redundancy version. Redundancy version 3 also includes a relatively large quantity of systematic bits and can also be decoded independently, and is a self-decodable redundancy version. However, the redundancy versions 1 and 2 mainly include parity bits and a small quantity of systematic bits, and are not self-decodable, but combined decoding can be performed on the redundancy versions 1 and 2 with a self-decodable redundancy version, and a combined bit sequence is used as an LDPC code, and has a low equivalent code rate, thereby reducing decoding complexity.

When bits in the buffer sequence W are transmitted one time or a plurality of times, corresponding redundancy versions are usually obtained sequentially based on the redundancy version sequence, and are transmitted. The redundancy version sequence may be indicated by a sequence of numbers of redundancy versions, or may be indicated by a sequence of starting positions of output bit sequences during all transmissions in the buffer sequence W or a sequence of numbers of the starting positions. The present application is not limited thereto. For transmission i, a corresponding starting position is determined based on the redundancy version sequence, and an output bit sequence rv(i) that may also be referred to as a to-be-sent redundancy version is obtained from the starting position in the buffer sequence W.

In a design, an sequence of starting positions may be circulated based on {0, 2, 3, 1}. In this design, during the initial transmission, redundancy version 0 is obtained from starting position 0; during the first retransmission, redundancy version 2 is obtained from starting position 2; during the second retransmission, redundancy version 3 is obtained from starting position 3; during the third retransmission, redundancy version 1 is obtained from starting position 1; during the fourth retransmission, redundancy version 0 is obtained from starting position 0; and the rest can be deduced by analogy.

An example in which encoding is performed based on an LDPC code (matrix) whose base graph is BG1 is used. In the base graph, column 0 to column 21 correspond to coded bits of information bits, and the rest columns correspond to coded bits of parity bits. Coded bits corresponding to two columns of built-in puncture bits, namely, column 0 and column 1, do not enter the circular buffer, thus the buffer sequence W is 66z, corresponding starting positions are {0z, 17z, 33z, 56z}, and correspondences between $rv_{idx}$ and the starting positions are shown in Table 1:

TABLE 1

| Starting position number $rv_{idx}$ | Starting position |
|---|---|
| 0 | 0z |
| 1 | 17z |
| 2 | 33z |
| 3 | 56z |

When $rv_{idx}$ is 0 or 3, an obtained output bit sequence includes a relatively large quantity of coded bits of information bits, that is, when the starting position in the buffer sequence W is bit 0 or bit 56z, an obtained output bit sequence includes a relatively large quantity of coded bits of information bits and is self-decodable.

When $rv_{idx}$ is 1 or 2, an obtained output bit sequence includes a relatively large quantity of parity bits, that is, when the starting position in the buffer sequence W is bit 17z or bit 33z, an obtained output bit sequence includes a relatively large quantity of parity bits and is not self-decodable, and the output bit sequence needs to be combined with a self-decodable redundancy version for decoding.

An example in which encoding is performed based on an LDPC code (matrix) whose base graph is BG2 is used. In the base graph, column 0 to column 9 correspond to coded bits of information bits, and the rest columns correspond to coded bits of parity bits. Coded bits corresponding to two columns of built-in puncture bits, namely, the column 0 and the column 1, do not enter the circular buffer, thus the buffer sequence W is 50z, corresponding starting positions are {0z, 13z, 25z, 43z}, and correspondences between $rv_{idx}$ and the starting positions are shown in Table 2:

TABLE 2

| Starting position number $rv_{idx}$ | Starting position |
|---|---|
| 0 | 0z |
| 1 | 13z |
| 2 | 25z |
| 3 | 43z |

When $rv_{idx}$ is 0 or 3, an obtained output bit sequence includes a relatively large quantity of coded bits of information bits, that is, when the starting position in the buffer sequence W is bit 0 or bit 43z, an obtained output bit sequence includes a relatively large quantity of coded bits of information bits and is self-decodable.

When $rv_{idx}$ is 1 or 2, an obtained output bit sequence includes a relatively large quantity of parity bits, that is, when the starting position in the buffer sequence W is bit 13z or bit 25z, an obtained output bit sequence includes a relatively large quantity of parity bits and is not self-decodable, and the output bit sequence needs to be combined with a self-decodable redundancy version for decoding.

In a possible design, the plurality of redundancy versions in the redundancy version sequence may each be a self-decodable redundancy version. For example, an example in which the redundancy version sequence is indicated by a sequence of redundancy version numbers is used, and the redundancy version sequence may be one of the following: {0, 3, 0, 3}, {0, 3, 3, 3}, {0, 0, 3, 3}, {0, 3, 3, 0}, {0, 0, 0, 3}, {0, 0, 0, 0} or {3, 3, 3, 3}.

In another possible design, for example, the redundancy version sequence is indicated by a sequence of redundancy version numbers, and the redundancy version sequence may be one of the following: {0, 3, 0, 3}, {0, 3, 3, 3}, {0, 0, 3, 3}, {0, 3, 3, 0}, {0, 0, 0, 3}, {0, 0, 0, 0}, {3, 3, 3, 3}, {0, 2, 3, 1}, or {0, 3, 2, 1}.

It should be noted that, in the sequences in the foregoing examples, the numbers may alternatively be replaced by corresponding starting positions for indication.

In a possible implementation, $rv_{idx}$ of an output bit sequence of each transmission loops in a sequence of 0 and 3 in the buffer sequence W. If the base graph of the LDPC matrix is BG1, the starting position loops in a sequence of 0z and 56z, or if the base graph of the LDPC matrix is BG2, the starting positions loops in a sequence of 0z and 43z. In this manner, because the redundancy version for each transmission is self-decodable, even if packet losses occur a plurality of times, a remaining redundancy version can also be self-decodable. In the foregoing manner of retransmitting a plurality of self-decodable redundancy versions, for a scenario with stable transmission and a small packet loss probability, once retransmission occurs, an equivalent code rate of a codeword obtained by combining redundancy versions received by a communication device at a receive end is relatively high, leading to relatively poor decoding performance. Optionally, in a packet loss-sensitive scenario, for example, in a grant free transmission mode or multislot aggregation mode, an output bit sequence during each transmission is obtained in the foregoing manner. In the grant free mode, a communication device at a transmit end has no uniquely specified air interface physical resource for data sending, and all communication devices at the transmit end perform contention-based sending in a resource pool. Consequently, a conflict occurs, and there is a relatively high possibility of being subject to strong interference. For example, if the initial transmission is subject to strong interference, the communication device at the receive end cannot implement IR-HARQ combination, and if there is a self-decodable redundancy version in the first retransmission, decoding can be completed by using a retransmitted redundancy version, thereby reducing a quantity of retransmissions, reducing an air interface delay, and saving resources.

In another possible implementation, starting position number of an output bit sequence of each transmission in the buffer sequence W may loop in a sequence of 0, 2, 3, and 1. If the base graph of the LDPC matrix is BG1, the starting position loops in a sequence of 0z, 33z, 56z, and 17z, or if the base graph of the LDPC matrix is BG2, the starting position loops in a sequence of 0z, 25z, 43z, and 13z. If no packet loss occurs during the initial transmission, the redundancy version for the initial transmission is self-decodable, or if the redundancy version for the initial transmission is lost, decoding can be completed only in at least the second retransmission, but an equivalent code rate of a codeword obtained by combining the redundancy versions for the first retransmission and the second retransmission is relatively low, and comprehensive decoding performance is relatively good. The possible implementation is applicable to most enhanced mobile broadband (eMBB) scenarios.

In another possible implementation, a starting position of an output bit sequence in the buffer sequence W may loop in a sequence of 0, 3, 2, and 1. If the base graph of the LDPC matrix is BG1, the starting position loops in a sequence of 0z, 56z, 33z, and 17z, or if the base graph of the LDPC matrix is BG2, the starting position loops in a sequence of 0z, 43z, 25z, and 13z. In this manner, if a packet loss occurs during the initial transmission, a self-decodable redundancy version is included during the first retransmission. Similarly, when at least two retransmissions occur, performance is the same as that of the previous implementation, and comprehensive decoding performance is relatively good. The possible implementation is also applicable to most eMBB and ultra-reliable and low latency communication (URLLC) scenarios.

In another possible design, the redundancy version sequence may be obtained based on a data transmission scenario. The redundancy version sequence indicates a sequence of sending a plurality of redundancy versions in the buffer sequence W, and a redundancy version for each data transmission may be determined based on the redundancy version sequence. The data transmission scenario may be determined based on at least one of the following factors, that is, the redundancy version sequence may be determined based on one or more of the following factors: a service type, a transmission mode, a transmission code rate, or the like. The service type may include eMBB, URLLC, voice over new radio (VoNR), massive machine type communication (mMTC), or the like. The transmission mode may include grant free, multislot (slot) aggregation, or the like. The service type and the transmission mode may be further combined, for example, eMBB service transmission in grant free mode or URLLC service transmission in multislot aggregation. It should be noted that, this is merely an example herein, and the present application is not limited thereto.

For example, if the service type is eMBB, the redundancy version sequence may be {0, 2, 3, 1} or {0, 3, 2, 1}.

For another example, if the service type is URLLC, the redundancy version sequence may be {0, 3, 2, 1} or {0, 3, 0, 3}.

For another example, if the transmission mode is grant free or multislot aggregation, the redundancy version sequence may be {0, 3, 0, 3}.

Because redundancy version configuration information may be determined based on the data transmission scenario, if the data transmission scenario is determined, the redundancy version sequence is also determined. For example, redundancy version sequences of different service types and/or in different transmission modes may be configured, predefined, or specified in a protocol. For example, if a service type of data transmission between the communication device 20 and the communication device 21 is eMBB, a sequence of {0, 2, 3, 1} may be selected as an sequence of starting positions of redundancy versions. For another example, if a service type of data transmission between the communication device 20 and the communication device 21 is URLLC, a sequence of 0, 3, 2, and 1 may be selected as a sequence of starting positions of redundancy versions. For another example, when the transmission mode is grant free or multislot aggregation, a sequence of 0, 3, 0, and 3 may be selected. Certainly, the redundancy version configuration information may be determined with reference to the service type and the transmission mode, and the redundancy version sequence may be further determined based on a factor such as channel transmission quality. These are merely examples for description herein, and the present application is not limited thereto.

302: Determine a transmission number.

303: Obtain a redundancy version from a buffer sequence based on the redundancy version sequence determined in step 301 and the transmission number determined in step 302, and send the redundancy version.

The communication device 20 may determine a redundancy version for each transmission based on the redundancy version sequence obtained from step 301, obtain an output bit sequence during each transmission from the buffer sequence W based on a starting position of the redundancy version, as a redundancy version, and send the redundancy version to the communication device 21.

For example, a BG1 base graph and a sequence of {0, 3, 0, 3} are used as an example, after the communication device 20 sends an output bit sequence that is obtained from the bit 0 in the buffer sequence W during the initial transmission, namely, the $0^{th}$ transmission, that is, the transmission number is 1, the communication device 20 receives a negative acknowledgment (NACK) from the communication device 21, so that the communication device 20 obtains an output bit sequence during the first retransmission (that is, the transmission number is 2) from the bit 56z in the buffer sequence W, that is, determines a redundancy version rv(1). The communication device 20 sends the output bit sequence rv(1) to the communication device 21. If the communication device 20 receives a NACK from the communication device 21, the communication device 20 obtains an output bit sequence during the second retransmission from the bit 0z in the buffer sequence W, that is, determines a redundancy version rv(2). The rest can be deduced by analogy. When a maximum quantity of retransmissions is reached or a retransmission timer expires, or the communication device 20 receives a positive acknowledgement (ACK) from the communication device 21, the communication device may end retransmission. Certainly, the communication device 20 may perform a plurality of retransmissions without considering a NACK or an ACK from the communication device 21.

During decoding, the communication device 21 at the receive end needs to combine soft value bits received during the initial transmission with soft value bits of redundancy versions for decoding. For a coded block on which LDPC encoding is performed, to improve decoding performance of the communication device at the receive end, a quantity of repeated bits or skipped bits of the redundancy versions needs to be reduced.

Optionally, the method may further include the following step.

304: Send information indicating the redundancy version sequence.

The communication device 20 may send, to the communication device 21, the information indicating the redundancy version sequence, so that the communication device 21 obtains an sequence of starting positions of redundancy versions for data transmission.

The redundancy version sequence may be indicated by a sequence of starting positions, or may be indicated by a sequence of numbers corresponding to starting positions, or each redundancy version sequence may be numbered and a sequence is indicated by a number. Table 3 shows some examples of correspondences between a plurality of sequences of starting positions and redundancy version configuration numbers, and this is not limited thereto.

TABLE 3

| Redundancy version sequence index | $rv_{idx}$ sequence | Sequence of starting positions in BG1 | Sequence of starting positions in BG2 |
|---|---|---|---|
| 0 | 0, 2, 3, 1 | 0z, 33z, 56z, 17z | 0z, 25z, 43z, 13z |
| 1 | 0, 3, 2, 1 | 0z, 56z, 33z, 17z | 0z, 43z, 25z, 13z |

TABLE 3-continued

| Redundancy version sequence index | $rv_{idx}$ sequence | Sequence of starting positions in BG1 | Sequence of starting positions in BG2 |
|---|---|---|---|
| 2 | 0, 3, 0, 3 | 0z, 56z, 0z, 56z | 0z, 43z, 0z, 43z |
| 3 | 0, 3, 3, 3 | 0z, 56z, 56z, 56z | 0z, 43z, 43z, 43z |
| 4 | 0, 3, 3, 0 | 0z, 56z, 56z, 0z | 0z, 43z, 43z, 0z |
| 5 | 0, 0, 0, 0 | 0z, 0z, 0z, 0z | 0z, 0z, 0z, 0z |
| 6 | 0, 0, 0, 3 | 0z, 0z, 0z, 56z | 0z, 0z, 0z, 43z |
| 7 | 0, 0, 3, 3 | 0z, 0z, 56z, 56z | 0z, 0z, 43z, 43z |
| 8 | 3, 3, 3, 3 | 56z, 56z, 56z, 56z | 43z, 43z, 43z, 43z |

The information indicating the redundancy version sequence may be indicated by any column in Table 3, that is, the information indicating the redundancy version sequence may be an index of the redundancy version sequence, or may be a sequence of sequences of numbers of starting positions, or may be an sequence of starting positions in different base graphs, or the like. It may be understood that, it is merely an example herein, and the present application is not limited thereto. In a possible implementation, the index of the redundancy version sequence may correspond to one transmission scenario, or the index of the redundancy version sequence may be an index of a transmission scenario, to obtain a corresponding redundancy version sequence based on a transmission scenario.

The communication device 20 may send, via a control channel or a data channel such as a downlink control channel, a downlink shared channel, or a downlink data channel, the information indicating the redundancy version sequence. The information indicating the redundancy version sequence may be carried by physical layer signaling, or may be carried by higher layer signaling such as radio resource control (RRC) signaling. In this manner, the communication device 20 and the communication device 21 may adjust a redundancy version configuration in real time based on a change in the transmission mode or the service type.

For example, the communication device 20 and the communication device 21 may initially perform data transmission based on a default redundancy version configuration, for example, may perform data transmission and retransmission processing based on an sequence of {0, 2, 3, 1}. If quality of transmission between the communication devices 20 and 21 or the service type or the transmission mode changes, the communication device 20 obtains a new redundancy version configuration based on step 301, and indicates the new redundancy version configuration to the communication device 21 via signaling, so that the communication devices 20 and 21 perform transmission based on a new sequence. It should be noted that, this is merely an example herein, and the present application is not limited thereto.

It should be noted that, step 304 is an optional step. In an implementation, the information indicating the redundancy version sequence may not need to be sent. For example, for a specific service type or in a scenario with a specific transmission mode, a particular redundancy version sequence may be predefined or specified in a protocol. In this case, the communication device 21 learns of the redundancy version sequence by determining the service type or the transmission mode, so that the communication device 20 may not need to send the information indicating the redundancy version sequence.

It should be noted that, step 304 may be performed before or after any step after step 301, and a sequence of step 304 is not specified in the present application.

Optionally, after the information processing method is performed, the communication device may further process the output bit sequence, so that the output bit sequence is used during sending or receiving. For example, the communication device may perform processing such as interleaving or mapping into modulated symbols on the output bit sequence. For the processing, refer to a corresponding processing method in the prior art. Details are not described herein again.

Figure 4:
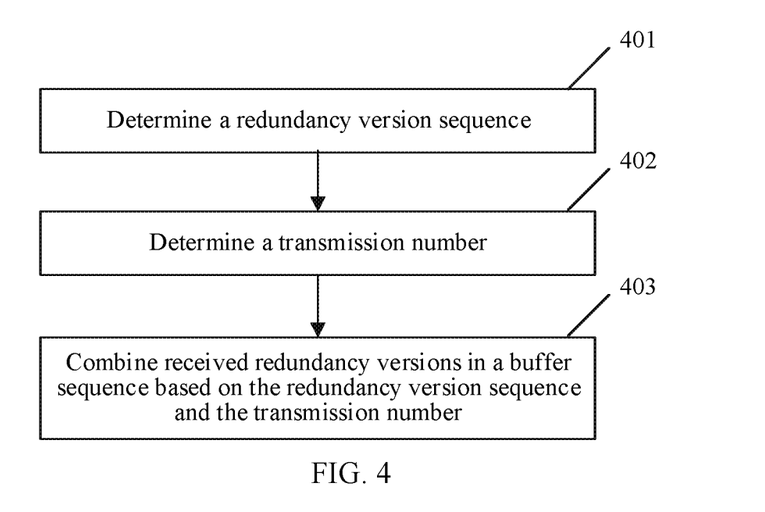
FIG. 4 is a flowchart of an information processing method according to some embodiments of the present application.

FIG. 4 is a flowchart of an information processing method according to an embodiment of the present application. The method may be applied to a communication system. The communication system includes a communication device 20 and a communication device 21. The method may be implemented by the communication device 21 and includes the following steps.

401: Determine a redundancy version sequence.

The redundancy version sequence is used to indicate a sequence of sending a plurality of redundancy versions, and each redundancy version corresponds to a starting position in a buffer sequence W.

In a possible design, for the redundancy version sequence, as described in the foregoing embodiment, the redundancy version sequence may be determined based on one or more of the following factors: a service type, a transmission mode, or a transmission code rate, and the redundancy version sequence is used to indicate the sequence of sending the plurality of redundancy versions. Refer to the descriptions in the foregoing embodiment.

In another possible design, for the redundancy version sequence, the information indicating the redundancy version sequence and sent by the communication device 20 in step 304 in the foregoing embodiment may be received, and the redundancy version sequence is determined based on the information indicating the redundancy version sequence. Refer to the descriptions in the foregoing embodiment.

402: Determine a transmission number.

403: Combine received redundancy versions in a buffer sequence W based on the redundancy version sequence determined in step 401 and the transmission number determined in step 402.

The communication device 21 receives a signal sent by the communication device 20. The signal includes a redundancy version corresponding to the buffer sequence W during a current transmission, namely, the redundancy version obtained by the communication device 20 from step 303 in the foregoing embodiment.

The communication device 21 demodulates the signal, to obtain a soft value sequence corresponding to the redundancy version during the current transmission.

A starting position for combination in the buffer sequence W is determined based on the redundancy version sequence and a quantity of current transmissions, and the soft value sequence of the redundancy version is combined into the buffer sequence W at the starting position.

Optionally, LDPC decoding may be further performed on soft value bits in the buffer sequence W.

The communication device 21 performs the LDPC decoding on the soft value bit in the buffer sequence W.

The buffer sequence W includes a soft value sequence of a bit sequence D or a part of a soft value sequence of a bit sequence D, a length of the soft value sequence of the bit sequence D is $K_D$ bits, and the bit sequence D is a bit sequence obtained by encoding a bit sequence C having a length of K based on a low-density parity-check LDPC matrix, or the bit sequence D is obtained by shortening $s_0$ bits from a bit sequence obtained by encoding a bit sequence C having a length of K based on a low-density parity-check LDPC matrix.

The communication device 20 sends the output bit sequence obtained in the foregoing embodiments to the communication device 21. It may be understood that, the output bit sequence in the foregoing embodiments is an output bit sequence obtained after rate matching, and the communication device 20 may perform processing such as interleaving and modulation on the output bit sequence obtained after the rate matching, to send a sending signal corresponding to the output bit sequence. After receiving the output signal and performing demodulation and de-interleaving on the output signal, the communication device 21 obtains a soft bit sequence corresponding to the output bit sequence. That is, one bit in the output bit sequence corresponds to one soft value bit (soft channel bit) in the soft bit sequence. Positions of soft value bits stored in a soft information buffer of the communication device 21 are in a one-to-one correspondence with locations of coded blocks in a circular buffer of the communication device 20. A size of the soft information buffer and a size of the coded block in the circular buffer are also the same and may be both $N_{CB}$.

For example, an output bit sent by the communication device 20 is 1, and after channel transmission, the communication device 21 learns that a corresponding soft value bit of the output bit is 1.45, and if a position of the output bit in the coded block is bit 5, soft value bit 5 in the soft information buffer of the communication device 21 is 1.45. It should be noted that, this is merely an example for description herein, and this embodiment of the present application is not limited thereto. If the output bit sequence obtained by the communication device 20 includes n output bits, the communication device 21 may obtain n corresponding soft value bits. If the communication device 21 receives soft value bits at a same position at two different times, soft values of the soft value bits received at two different times are combined. For example, if a soft value bit received during the first transmission is 1.45 and a soft value bit received during the second transmission is 0.5, 1.95 is obtained after combination. It should be noted that, this is merely an example herein, and the present application is not limited thereto.

It can be learned that, the redundancy version sequence has a corresponding feature in the foregoing embodiments. Refer to the foregoing embodiments. Details are not described herein again. It should be noted that, for the communication device 20, the buffer sequence W is a coded block in the circular buffer, and in the communication device 21, the buffer sequence W is a soft value sequence in the soft information buffer. On a side of the communication device 20, an output bit sequence is determined in the coded block in the circular buffer, and on a side of the communication device 21, a received soft value sequence is stored in the soft information buffer.

Figure 5:
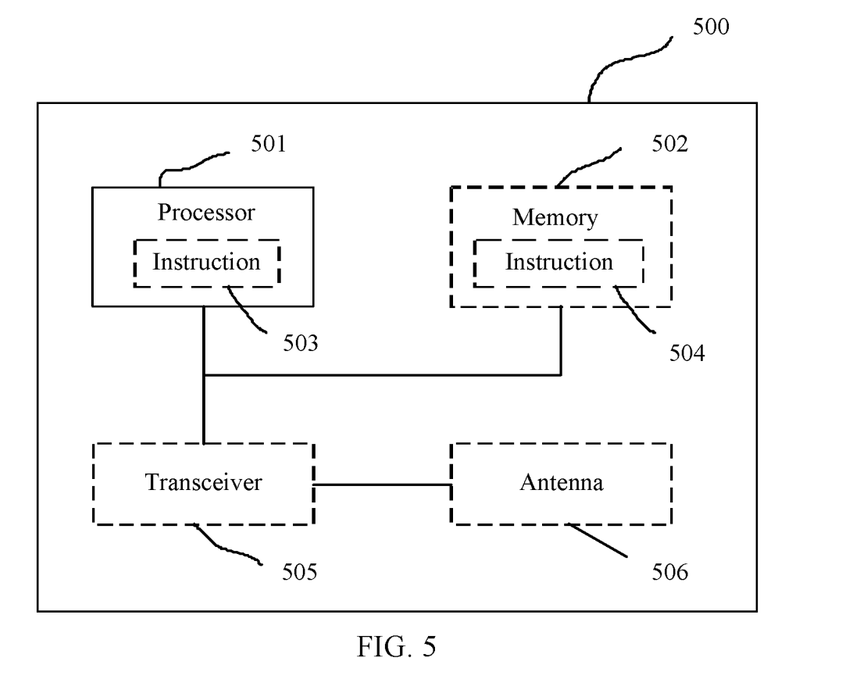
FIG. 5 is a structural diagram of an information processing apparatus according to some embodiments of the present application.

FIG. 5 is a schematic structural diagram of a communication apparatus 500. The apparatus 500 may be configured to implement the method described in the foregoing method embodiment. Refer to the descriptions in the foregoing method embodiment. The communication apparatus 500 may be a chip, a base station, a terminal, or another network device. Alternatively, the communication apparatus 500 may be the communication device 20 or the communication device 21 in FIG. 2.

The communication apparatus 500 includes one or more processors 501. The processor 501 may be a general-purpose processor, a dedicated processor, or the like. For example, the processor 501 may be a baseband processor or a central processing unit. The baseband processor may be configured to process a communication protocol and communication data, and the central processing unit may be configured to control the communication apparatus (such as a base station, a terminal, or a chip), execute a software program, and process data in the software program.

In a possible design, the communication apparatus 500 includes the one or more processors 501, and the one or more processors 501 may be configured to implement the method in the embodiment shown in FIG. 3 or FIG. 4. Optionally, the processor 501 may further implement another function in addition to the method in the embodiment shown in FIG. 3 or FIG. 4, for example, a function of the rate matching module or the rate de-matching module in FIG. 2.

The communication apparatus 500 determines a redundancy version sequence, where the redundancy version sequence is used to indicate a sequence of sending a plurality of redundancy versions; determines a transmission number; and obtains a redundancy version from a buffer sequence based on the redundancy version sequence and the transmission number, and sends the redundancy version.

In a possible design, the one or more processors 501 may be configured to implement the method in the embodiment shown in FIG. 4.

The communication apparatus 500 determines a redundancy version sequence, where the redundancy version sequence is used to indicate a sequence of sending a plurality of redundancy versions; determines a transmission number; and combines received redundancy versions in a buffer sequence based on the redundancy version sequence and the transmission number. Optionally, the communication apparatus 500 may perform LDPC decoding on soft value bits in the buffer sequence.

In an optional design, the processor 501 may also include an instruction 503, and the instruction may be run on the processor, so that the communication apparatus 500 is enabled to perform the methods described in the foregoing method embodiments.

In another possible design, the communication apparatus 500 may also include a circuit, and the circuit may implement functions in the foregoing method embodiments. Optionally, the communication apparatus 500 may include one or more memories 502, storing an instruction 504, and the instruction may be run on the processor, so that the communication apparatus 500 is enabled to perform the methods described in the foregoing method embodiments. Optionally, the memory may further store data. Optionally, the processor may also store an instruction and/or data. The processor and the memory may be separately disposed or may be integrated together. Optionally, the one or more memories 502 may store a parameter or the like related to a starting position and a redundancy version.

In another design, the one or more processors 501 may be configured to implement the functions of the modules shown in FIG. 2, for example, functions of the modules in the communication device 20 or the communication device 21.

Optionally, the communication apparatus 500 may further include a transceiver 505 and an antenna 506. The processor 501 may be referred to as a processing unit, and controls the communication apparatus (a terminal or a base station). The transceiver 505 may be referred to as a transceiver unit, a transceiver, a transceiver circuit, a transceiver interface, or the like, and is configured to implement sending and receiving functions of the communication apparatus by using the antenna 506, for example, send and receive information indicating the redundancy version sequence, and send and receive a signal including a redundancy version.

Optionally, the communication apparatus 500 may further include a component configured to generate a transport block CRC, a component configured to perform code block segmentation and CRC check, an encoder, an interleaver used for interleaving, a modulator used for modulation processing, or the like. Functions of these components may be implemented by the one or more processors 501.

Optionally, the communication apparatus 500 may further include a demodulator configured to perform a demodulation operation, a de-interleaver for de-interleaving, a decoder, or the like. Functions of these components may be implemented by the one or more processors 501.

Various illustrative logical blocks and steps that are listed in the embodiments of the present application may be implemented by using electronic hardware, computer software, or a combination thereof. Whether the functions are implemented by using hardware or software depends on particular applications and a design requirement of the entire system. Various methods may be used to implement the described functions for each particular application, but it should not be considered that the implementation goes beyond the scope of the embodiments of the present application.

The various illustrative logical units and circuits described in the embodiments of the present application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of the present application may be directly embedded into hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor so that the processor may read information from the memory and write information to the memory. Optionally, the memory may further be integrated into a processor. The processor and the memory may be arranged in an ASIC, and the ASIC may be arranged in UE. Optionally, the processor and the memory may be arranged in different components of the UE.

With descriptions of the foregoing embodiments, it is understood that the present application may be implemented by hardware, firmware, or a combination thereof. When the present application is implemented by using a software program, all or a part of the present application may be implemented in a form of a computer program product. The computer program product includes one or more computer instructions (which may also be referred to as a program or code). When the computer instructions are loaded and executed on the computer, the procedures or functions according to the embodiments of the present application are all or partially generated. When the present application is implemented by a software program, the foregoing functions may be stored in a computer-readable medium or transmitted as one or more instructions or code in the computer-readable medium. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. The computer-readable medium includes a computer storage medium and a communication medium, where the communication medium includes any medium that enables a computer program to be transmitted from one place to another. The storage medium may be any available medium accessible to a computer. The following provides an example but does not impose a limitation: the computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, and the coaxial cable, optical fiber/cable, twisted pair, DSL, or wireless technologies such as infrared ray, radio, and microwave are included in fixation of a medium to which they belong. For example, a disk used in the present application include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In conclusion, what is described above is merely example embodiments of the technical solutions of the present application, but is not intended to limit the protection scope of the present application. Any modification, equivalent replacement, or improvement made without departing from the principle of the present application shall fall within the protection scope of the present application.

What is claimed is:

1. A method for wireless communication, comprising:
   determining a transmission order of a plurality of redundancy versions, wherein the transmission order of the plurality of redundancy versions is determined based on a transmission mode, wherein the transmission mode is grant free; and
   transmitting one or more of the redundancy versions in the plurality of redundancy versions according to the transmission order;
   wherein the redundancy versions in the plurality of redundancy versions are numbered starting from 0, and the transmission order of the plurality of redundancy versions is {0, 3, 0, 3}.

2. The method according to claim 1, further comprising:
   determining a maximum number of retransmission for the plurality of redundancy versions.

3. The method according to claim 2, wherein a total number of transmissions of the plurality of redundancy versions is less than or equal to the maximum number of retransmission for the plurality of redundancy versions plus one.

4. The method according to claim 1, wherein each redundancy version in the plurality of redundancy versions is a bit sequence obtained from a buffered sequence at a starting position, wherein the buffered sequence comprises a quantity $N_{CB}$ of bits from a bit sequence D, and wherein the bit sequence D is a low density parity check (LDPC) encoded sequence.

5. The method according to claim 4, wherein a first-transmitted redundancy version is a redundancy version 0, and the starting position of the redundancy version 0 is a position 0 of the buffered sequence.

6. The method according to claim 5,
   wherein when $N_{CB}=66z$;
   wherein the starting position of redundancy version 1 is a position 17z of the buffered sequence;
   wherein the starting position of redundancy version 2 is a position 33z of the buffered sequence; and
   wherein the starting position of redundancy version 3 is a position 56z of the buffered sequence;
   wherein z is a lifting size.

7. The method according to claim 5,
   wherein $N_{CB}=50z$;
   wherein the starting position of redundancy version 1 is a position 13z of the buffered sequence;
   wherein the starting position of redundancy version 2 is a position 25z of the buffered sequence; and
   wherein the starting position of redundancy version 3 is a position 43z of the buffered sequence;
   wherein z is a lifting size.

8. The method according to claim 1, further comprising:
   repeating transmission of the plurality of redundancy versions according to the transmission order, until a maximum number of repeated transmissions is reached.

9. The method according to claim 1, further comprising:
   obtaining a radio resource control (RRC) signaling via a downlink channel;
   wherein the RRC signaling carries indication information of the transmission order of the plurality of redundancy versions.

10. A communication apparatus, comprising:
    at least one memory; and
    at least one processor operably coupled to the at least one memory;
    wherein the at least one processor is configured to:
      determine a transmission order of a plurality of redundancy versions, wherein the transmission order of the plurality of redundancy versions is determined based on a transmission mode, wherein the transmission mode is grant free; and
      transmit one or more of the redundancy versions in the plurality of redundancy versions according to the transmission order;
      wherein the redundancy versions in the plurality of redundancy versions are numbered starting from 0, and the transmission order of the plurality of redundancy versions {0, 3, 0, 3}.

11. The apparatus according to claim 10, wherein the at least one processor is configured to:
    determine a maximum number of retransmission for the plurality of redundancy versions.

12. The apparatus according to claim 11, wherein a total number of transmissions of the plurality of redundancy versions is less than or equal to the maximum number of retransmission for the plurality of redundancy versions plus one.

13. The apparatus according to claim 10, wherein each redundancy version in the plurality of redundancy versions is a bit sequence obtained from a buffered sequence at a starting position, wherein the buffered sequence comprises a quantity $N_{CB}$ of bits from a bit sequence D, and wherein the bit sequence D is a low density parity check (LDPC) encoded sequence.

14. The apparatus according to claim 13, wherein a first-transmitted redundancy version is a redundancy version 0, and the starting position of the redundancy version 0 is a position 0 of the buffered sequence.

15. The apparatus according to claim 14,
wherein $N_{CB}=66z$;
wherein the starting position of redundancy version 1 is a position 17z of the buffered sequence;
wherein the starting position of redundancy version 2 is a position 33z of the buffered sequence; and
wherein the starting position of redundancy version 3 is a position 56z of the buffered sequence;
wherein z is a lifting size.

16. The apparatus according to claim 14,
wherein $N_{CB}=50z$;
wherein the starting position of redundancy version 1 is a position 13z of the buffered sequence;
wherein the starting position of redundancy version 2 is a position 25z of the buffered sequence; and
wherein the starting position of redundancy version 3 is a position 43z of the buffered sequence;
wherein z is a lifting size.

17. The apparatus according to claim 10, wherein the at least one processor is configured to:
repeat transmission of the plurality of redundancy versions according to the transmission order, until a maximum number of repeated transmissions is reached.

18. The apparatus according to claim 10, wherein the at least one processor is further configured to:
obtain a radio resource control (RRC) signaling via a downlink channel;
wherein the RRC signaling carries indication information of the transmission order of the plurality of redundancy versions.

19. A non-transitory computer readable storage medium having instructions stored thereon that, when run on a computer, cause the computer to perform operations comprising:
determining a transmission order of a plurality of redundancy versions, wherein the transmission order of the plurality of redundancy versions is determined based on a transmission mode, wherein the transmission mode is grant free; and
transmitting one or more of the redundancy versions in the plurality of redundancy versions according to the transmission order;
wherein the redundancy versions in the plurality of redundancy versions are numbered starting from 0, and the transmission order of the plurality of redundancy versions is {0, 3, 0, 3}.

20. The non-transitory computer readable storage medium according to claim 19, wherein the operations further comprise:
determining a maximum number of retransmission for the plurality of redundancy versions.

21. The non-transitory computer readable storage medium according to claim 20, wherein a total number of transmissions of the plurality of redundancy versions is less than or equal to the maximum number of retransmission for the plurality of redundancy versions plus one.

22. The non-transitory computer readable storage medium according to claim 19, wherein each redundancy version in the plurality of redundancy versions is a bit sequence obtained from a buffered sequence at a starting position, wherein the buffered sequence comprises a quantity $N_{CB}$ of bits from a bit sequence D, and wherein the bit sequence D is a low density parity check (LDPC) encoded sequence.

23. The non-transitory computer readable storage medium according to claim 22, wherein a first-transmitted redundancy version is a redundancy version 0, and the starting position of the redundancy version 0 is a position 0 of the buffered sequence.

24. The non-transitory computer readable storage medium according to claim 23,
wherein $N_{CB}=66z$;
wherein the starting position of redundancy version 1 is a position 17z of the buffered sequence;
wherein the starting position of redundancy version 2 is a position 33z of the buffered sequence; and
wherein the starting position of redundancy version 3 is a position 56z of the buffered sequence;
wherein z is a lifting size.

25. The non-transitory computer readable storage medium according to claim 23,
wherein $N_{CB}=50z$;
wherein the starting position of redundancy version 1 is a position 13z of the buffered sequence;
wherein the starting position of redundancy version 2 is a position 25z of the buffered sequence; and
wherein the starting position of redundancy version 3 is a position 43z of the buffered sequence;
wherein z is a lifting size.

26. The non-transitory computer readable storage medium according to claim 19, wherein the operations further comprise:
repeating transmission of the plurality of redundancy versions according to the transmission order, until a maximum number of repeated transmissions is reached.

27. The non-transitory computer readable storage medium according to claim 19, wherein the operations further comprise:
obtaining a radio resource control (RRC) signaling via a downlink channel;
wherein the RRC signaling carries indication information of the transmission order of the plurality of redundancy versions.

* * * * *

UNITED STATES PATENT AND TRADEMARK OFFICE
CERTIFICATE OF CORRECTION

PATENT NO. : 11,277,231 B2  
APPLICATION NO. : 16/833655  
DATED : March 15, 2022  
INVENTOR(S) : Ma et al.

Page 1 of 1

It is certified that error appears in the above-identified patent and that said Letters Patent is hereby corrected as shown below:

In the Claims

Claim 6, Column 22, Line 17: "wherein when $N_{CB} = 66z$;" should read -- wherein $N_{CB} = 66z$; --.

Signed and Sealed this  
Twenty-sixth Day of July, 2022

Katherine Kelly Vidal  
*Director of the United States Patent and Trademark Office*